Patented Oct. 13, 1953

2,655,492

UNITED STATES PATENT OFFICE 2,655,492

POLYETHYLENE COMPOSITIONS CONTAINING STYRENE-ISOBUTYLENE COPOLYMERS

David W. Young, Roselle, and Paul E. Hardy, Elizabeth, N. J., assignors to Standard Oil Development Company, a corporation of Delaware No Drawing. Application October 29, 1948, Serial No. 57,408

3 Claims. (Cl. 260—45.5)

This invention relates to improved plastic compositions comprising a major proportion of high molecular weight solid polyethylene and a minor proportion of an aromatic-alkene hydrocarbon copolymer having plasticizing and otherwise improving characteristics.

Solid polyethylene, having the molecular weight in the range of 10,000 to 100,000, or more, preferably 15,000 to 80,000, such as may be made by known methods, e. g., polymerization under high pressure and temperature by the use of a small amount of oxygen or other agent as promoter, has been found to have many valuable characteristics, but is difficult to process, chiefly on account of its inherent stiff, tough characteristics and lack of thermoplastic properties. Numerous known plasticizers have been tried for improving the workability of polyethylene, but few of these impart the desired characteristics without either reducing some of the good properties inherent in the polyethylene, or without actually imparting harmful characteristics due to the presence of the plasticizer.

It is an object of the present invention to accomplish the desired plasticizing or improvement in processability without harmfully reducing the toughness and other good characteristics of the polyethylene, and at the same time making blends which have other improved properties.

The hydrocarbon copolymer used as plasticizer according to the present invention, may be made broadly within the teachings of Patent 2,274,749, but for the purposes of this invention, it must be made under certain restricted combinations of conditions; namely, by copolymerizing 40 to 70% by weight, preferably 50 to 65% by weight of a polymerizable monoolefinic aromatic compound with an alkene of 3 to 8, preferably 4 to 5, carbon atoms, at a temperature below —50° C., preferably below —70° C., preferably using a lower alkyl halide liquid as solvent for the raction mixture, and using a catalyst strong enough to produce a copolymer having an intrinsic viscosity greater than 0.5 (as determined in toluene). The catalyst may appropriately be a solution of aluminum chloride in a lower alkyl halide such as methyl chloride or ethyl chloride. Other known Friedel-Crafts catalysts, preferably predissolved in a solvent, may be used.

For purposes of the present invention, the copolymer to be used should comply with the following requirement; namely, that the arithmetic product of the intrinsic viscosity times the percent of combined aromatic constituent less 30, should be greater than 15, and preferably greater than 20. Thus, if the copolymer is a styrene-isobutylene copolymer containing 60% of combined styrene, an intrinsic viscosity of 0.7 will be satisfactory, because the arithmetic product in question calculates to be 21, (60—30×0.7=21). On the other hand, with a styrene content of 50%, a substantially correspondingly satisfactory intrinsic viscosity would be about 1.0

$$(50-30 \times 1.0 = 20)$$

and in the case of a copolymer having about the minimum usable styrene content, namely 40%, an intrinsic viscosity of about 2.0 would be required (40—30×2.0=20).

In preparing the hydrocarbon copolymer, other monomers may be used instead of styrene and isobutylene. For instance, various lower alkyl-substituted styrenes may be used such as para-methyl styrene, paraethyl styrene, alphamethyl-paramethyl styrene, and other polymerizable mono-olefinic compounds containing an aromatic nucleus, such as vinyl naphthalene, indene, and etc. Although the alkene may be any of those having 3 to 8 carbon atoms such as propylene, the various butylenes, amylenes and octenes, it is preferred to use isoolefins having 4 to 6 carbon atoms especailly isobutylene and 2-methyl 1-butene.

If desired, the above-described copolymer may be treated by chemical treatment such as by mild chlorination, nitration or sulfonation, to make a copolymer having modified properties, such as increased resistance to solubility in mineral oils or fatty oils, yet still retaining the desired property of improving the proessability of the polyethylene with which it is compounded.

Another optional feature of the invention is that in addition to compounding the polyethylene with 10 to 50% by weight of an aromatic-alkene copolymer of 40 to 70% combined aromatic constituent and having an intrinsic viscosity above 0.5, one may also incorporate with those two primary ingredients a lesser amount such as 5 to 30%, preferably 10 to 20% by weight, based on the finished composition, of a related aromatic-alkene copolymer having a lower molecular weight, i. e., in the range of 0.1 to 0.5 intrinsic viscosity, and preferably also having a combined aromatic constituent in the proportion of 40 to 70%, preferably 50 to 60% by weight.

A further optional feature of the invention is the possible incorporation of high molecular weight polystyrene, in minor proportions such as about 5 to 30% by weight based on the finished composition. This material tends to improve the hardness and gloss of the finished composition films or molded products.

The compounding of the compositions of the present invention may be effected in a variety of ways, preferably by hot mixing as on a mill such as the steel rolls conventionally used for milling rubber, or in kneader type mixers which are equipped with suitable heating means. The mixing is preferably carried out at a temperature in the range of 200–300° F., generally about 220–260° F.

If desired, of course, minor amounts of other materials may be added to the plastic compositions of this invention. For instance, 1 to 5% of zinc stearate, or stearic acid, or other materials may be added in order to facilitate handling, particularly to prevent sticking of the composition to the steel rolls at elevated temperature. Another such additive is a type of hard synthetic wax of the modified fatty acid ester type such as those marketed under the trade name, Acrawax. Small amounts of fillers such as clay, calcium carbonate, carbon black, etc., as well as dyes or pigments, anti-oxidants, etc. may also be used.

The finished composition should have a tensile strength of at least 1000 lbs./sq. in., preferably at 1200 lbs./sq. in., and a resistance to plastic deformation corresponding to a Williams plasticity of at least 330, and preferably at least 380, at 90° C. with a 5 kg. weight. It should also desirably have a wear factor less than 7 in the Taber abrasion test, using a 500 gram weight, and a moisture vapor permeability not substantially over .35 in the General Foods moisture vapor test.

The invention will be better understood from a consideration of the following examples:

Example 1

Equal parts by weight of a polyethylene having a molecular weight of about 19,000, and a styrene-isobutylene copolymer of 60% by weight combined styrene and an intrinsic viscosity of 0.8, were compounded by mill mixing at a temperature of about 280° F. The resulting composition was subsequently rolled into thin sheets or films, and found to have improved resistance to moisture vapor penetration.

Example 2

A composition was prepared having 85% by weight of a polyethylene having molecular weight of 20,000, with 15% by weight of a styrene-isobutylene copolymer having 50% combined styrene and an intrinsic viscosity of 0.9. The composition was made by mixing on a hot mill at 150° C. The composition showed a tensile strength of 1500 lbs./sq. in. and an elongation of 640.

Example 3

Example 2 was repeated except that 30% copolymer was used instead of 15%. The resulting composition had a tensile strength of 1100 lbs./sq. in. and an elongation of 600%.

Examples 4 to 7 (inclusive)

A series of tests is described herewith to show the unexpected results and advantages of this invention. This series of tests, four blends were made by compounding four different percentages, namely, 15, 30, 40 and 50 by weight, of a styrene-isobutylene copolymer having 60% combined styrene and an intrinsic viscosity of about 0.8 with 85, 70, 60, and 50% respectively of a solid polyethylene having a molecular weight of about 20,000. Mixing was done by hot milling for 15 minutes at a temperature of 260–280° F. For comparative purposes, a sample of the polyethylene per se and the styrene-isobutylene per se were tested under the same conditions. To each material was added 1% of stearic acid and 2.5% of Acrawax B which is a high molecular weight solid ester processing aid, in order to help prevent the materials from sticking to the hot rolls.

The polyethylene (referred to as test A) before blends referred to as Examples 4, 5, 6, and 7 respectively, and the styrene-isobutylene copolymer per se referred to as test B, were all subjected to the following tests: Williams plasticity, wear (Taber abrasion test), and moisture vapor permeability (by the General Foods moisture vapor test). The results are tabulated as follows:

|  | A | Ex. 4 | Ex. 5 | Ex. 6 | Ex. 7 | B |
|---|---|---|---|---|---|---|
| Polyethylene | 100.0 | 85.0 | 70.0 | 60.0 | 50.0 | |
| Copolymer | | 15.0 | 30.0 | 40.0 | 50.0 | 100.0 |
| Ester wax | 2.5 | 2.5 | 2.5 | 2.5 | 2.5 | 2.5 |
| Stearic acid | 1.0 | 1.0 | 1.0 | 1.0 | 1.0 | 1.0 |
| Williams plasticity, recovery, 5 kg. wt. at 90° C | 413 | 395 | 395 | 390 | 367 | 172 |
| Wear factor [1] | 16.4 | 11.4 | 5.3 | 1.5 | 9.0 | 10.4 |
| Moisture vapor [2] | 0.41 | 0.39 | 0.35 | 0.44 | 0.47 | 0.58 |

[1] Taber abrasion test—500 gr. weight used $$\text{Wear factor} = \frac{1,000}{\text{No. cycles}} \times \text{loss weight}$$

[2] General Foods moisture vapor test—MVP/4 mils thickness.

The above data show, in regard to the Williams plasticity test, that although polyethylene per se shows a high value of 413 and the styrene-isobutylene copolymer (test B) shows a relatively much lower value, i. e. 172, that blends of from 15% up to as much as 40% of the copolymer can be made without reducing the Williams plasticity value below 390. This is a very surprising advantage of the invention, that in spite of the great plasticizing effect of the styrene-isobutylene copolymer of the polyethylene, the resulting blends containing even as much as 40% copolymer retain such an unexpectedly high percentage of the resistance to plastic deformation. These proportions of materials, i. e., 15 to 40% of copolymer, represent the preferred range. The 50% blend identified as Example 7 shows a slightly greater reduction in the Williams plasticity value, namely, 367, but this is still far above 293 which is the arithmetic average of 413 and 172, which would normally be expected with a blend of equal proportions of these two materials. This 50% blend comes within the broader limits of the present invention, but is not within the preferred range of 15 to 40% of copolymer.

Another unexpected advantage of the invention is demonstrated in the data on the wear factor. These figures indicate that whereas polyethylene alone showed a wear of 16.4 and the styrene-isobutylene coplymer alone showed a wear of 10.4, the blends containing from 15 to 50% of the copylmer in polyethylene showed wear values ranging from 11.4 down to as low as 1.5 (obtained with the 40% copolymer blend). The wear values for all four blends were far better (lower) than what would be expected from an arithmetic proportionate averaging of the values for the separate individual materials. In fact, the blends containing 30, 40 and 50% of the copolymer, respectively, showed wear figures even below either of the separate constituents.

Similarly, the moisture vapor permeability data in the above table shows that all four blends were surprisingly better than would be expected by a proportionate averaging of the figures for the separate materials, and here again, two of the blends, namely those containing 15 and 30% of the copolymer, respectively, showed moisture vapor permeability figures below either of the separate ingredients.

The compositions of this invention are especially adapted for making artificial fibers as substitute for textile fibers, e. g., cotton, silk, wool, flax, hemp, etc.

We claim:

1. Composition comprising 85 to 60% by weight of a solid polyethylene having a molecular weight of about 20,000, and 15 to 40% by weight of a styrene-isobutylene coplymer having about 60% combined styrene and an intrinsic viscosity of 0.7 to 0.8, said composition having a tensile strength greater than 1000 lbs./sq. in. and a Williams plasticity of at least 330 at 90° C. using a 5 kg. weight.

2. Composition consisting essentially of about 70% by weight of a solid polyethylene having a molecular weight of about 20,000, and about 30% by weight of a styrene-isobutylene coplymer having 60% combined styrene and an intrinsic viscosity of about 0.8, said composition having a tensile strength above 1200 lbs./sq. in., a Williams plasticity of at least 380 at 90° C. with a 5 kg. weight, a wear factor of less than 7 in the Taber abrasion test, using a 500 gram weight, and a moisture vapor permeability of not substantially more than .35 in the General Foods moisture vapor test.

3. The method of plasticizing and otherwise improving a solid polyethylene having a molecular weight of about 20,000 which comprises hot milling together at a temperature of about 220–300° F., about 70% by weight of said polyethylene with about 30% by weight of a styrene-isobutylene copolymer having about 60% by weight of combined styrene and an intrinsic viscosity of about 0.8.

DAVID W. YOUNG.
PAUL E. HARDY.

References Cited in the file of this patent

UNITED STATES PATENTS

| Number | Name | Date |
|---|---|---|
| 2,339,958 | Sparks | Jan. 25, 1944 |
| 2,369,471 | Latham | Feb. 13, 1945 |
| 2,446,536 | Hardy | Aug. 10, 1948 |
| 2,468,534 | Young et al. | Apr. 26, 1949 |
| 2,491,525 | Sparks et al. | Dec. 20, 1949 |
| 2,516,741 | Young et al. | July 25, 1950 |

FOREIGN PATENTS

| Number | Country | Date |
|---|---|---|
| 599,803 | Great Britain | Mar. 22, 1948 |
| 121,162 | Australia | (Application lapsed. Advertised Mar. 21, 1946, received in U. S. Pat. Off. Aug. 2, 1946.) |

OTHER REFERENCES

Slotterbeck et al., Official Digest #240, November 1944, pages 511–516.